United States Patent [19]

Sugiyama et al.

[11] Patent Number: 5,579,116
[45] Date of Patent: Nov. 26, 1996

[54] VIDEO PRINTER AND PRINTING METHOD IN USE WITH THE SAME

[75] Inventors: Naoshi Sugiyama; Kazuo Miyaji, both of Saitama, Japan

[73] Assignee: Fuji Photo Film Co., Ltd., Kanagawa, Japan

[21] Appl. No.: 277,627

[22] Filed: Jul. 20, 1994

[30]   Foreign Application Priority Data

Jul. 22, 1993   [JP]   Japan ..................... 5-181478

[51] Int. Cl.⁶ ............... H04N 1/23; H04N 1/40; H04N 1/387
[52] U.S. Cl. .............. 358/296; 358/298; 358/449; 358/450
[58] Field of Search ................... 358/296, 298, 358/401, 446, 448, 453, 488, 498, 501, 503, 530, 534, 537, 538, 540, 909.1; 355/202, 204; 395/101, 108, 109, 112, 114–118, 133, 135, 137, 145, 146, 155; 382/254, 256–258, 276, 282, 284, 286, 287, 289, 290, 294, 296–298, 302, 305, 311; 347/171, 172, 175

[56]   References Cited

U.S. PATENT DOCUMENTS 5,047,864  9/1991  Fujito ........................... 358/296
5,093,730  3/1992  Ishii et al. ..................... 358/296
5,109,281  4/1992  Kobori et al. .................. 358/296
5,115,320  5/1992  Ebihara et al. ................. 358/296
5,231,516  7/1993  Kamon et al. ............... 358/296 X
5,252,989  10/1993  Kawakami et al. ............. 347/171
5,260,805  11/1993  Barrett ......................... 358/449
5,410,335  4/1995  Sawano et al. ................. 347/172
5,432,532  7/1995  Mochimaru et al. ......... 358/296 X
5,448,685  9/1995  Ogura et al. .................... 395/117
5,485,554  1/1996  Lowitz et al. ................... 395/116

Primary Examiner—Peter S. Wong
Assistant Examiner—Eric Frahm

[57]   ABSTRACT

A video printer is supplied with image information, which represents a halftone image having an aspect ratio of 4/3. A rotationally converting section in IC converts the image information so that orientation of the image makes one fourth rotation. A size reducing section in IC processes the image information to reduce a size of the image. A thermal recording head is supplied with the image information after the reduction and the rotational conversion, and records the image on a color thermosensitive recording sheet, which has an aspect ratio of 4/3. The image is recorded in an upper half of the recording sheet. A phrase memory stores phrase information. A synthesizing circuit combines the phrase information with the image information after the reduction and the rotational conversion. The phrase is preferably recorded in a lower half of the recording sheet and outside the image.

31 Claims, 9 Drawing Sheets

VIDEO PRINTER AND PRINTING METHOD IN USE WITH THE SAME

BACKGROUND OF THE INVENTION

1. Field of the Invention

The present invention relates to a video printer for printing an image on a recording sheet in accordance with image information, and a printing method in use with the same. More particularly, the present invention relates to a video printer in which a postcard can be printed with great ease.

2. Description Related to the Prior Art

A known video printer is supplied with a video imaging signal by a video tape recorder, electronic still camera, or other types of video recorders. The video printer converts the video imaging signal into digital form, retrieves it in a frame memory or field memory, and processes it to record the image. The video printer entered one of plural preset printing modes, including: a normal mode in which a video image of one frame is recorded substantially on an entirety of a recording sheet of the A6 size, which defines an aspect ratio approximating that of to a monitoring screen having an aspect ratio of approximately 3:4; and multi-printing modes in which an image is reduced at a proportion of ½, ⅓ and ¼ and the frame is divided into four, nine and sixteen areas. There has been a recent proposal of a printer, which also has a two-frame multi-printing mode in which each of the images displayed on the monitoring screen is converted to change from the horizontal orientation to a vertical orientation, and a pair of such images are printed on respective halves on the recording sheet.

However, the entire area of the recording sheet is used for printing in any mode of the above printer. There is only a very small margin. Although a recording sheet having a size of a postcard could be used, the surface where an image is printed could not be used for writing a phrase, comments, or other literal expression, because only the very small margin remains on the recording sheet. There is no known printer convenient for printing a postcard.

SUMMARY OF THE INVENTION

In view of the foregoing problems, an object of the present invention is to provide a video printer convenient for printing postcards.

Another object of the present invention is to provide a video printer capable of automatically printing a phrase associated with an image.

In order to achieve the above and other objects and advantages of this invention, a video printer is provided for recording an image on a recording sheet in accordance with image information, wherein the image has a predetermined aspect ratio and is horizontally long. The aspect ratio is substantially equal to an aspect ratio of the recording sheet. The video printer includes a size reducing device for processing the image information to reduce a size of the image. A rotationally converting device rotates the image information such that the orientation of the image makes a one fourth rotation. A recording head is supplied with the image information after the reduction and the rotational conversion, and records the image on the recording sheet. The image is recorded in a predetermined portion of the recording sheet. Therefore, a postcard can be printed with great convenience.

In a preferred embodiment, a phrase memory stores information of a phrase. An image combining device combines the phrase information with the image information after the reduction and the rotational conversion. The phrase is recorded on the recording sheet outside where the image is recorded. The phrase associated with an image can be automatically printed easily.

A display device is provided with an aspect ratio substantially equal to the aspect ratio of the recording sheet, and displays an entirety of the image to be monitored. A trimming device limits a part of the image information after the reduction and the rotational conversion, to designate part of the displayed image as a range to be recorded, the range defined by reducing the image in a direction along one side of the image.

The range to be recorded is defined by reducing the image vertically. A line generator is connected to the display device, for causing the display device to indicate at least one trimming line, the trimming line representing a top or bottom edge of the range limited by the trimming device. Accordingly, the finished postcard can have a well-balanced layout.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
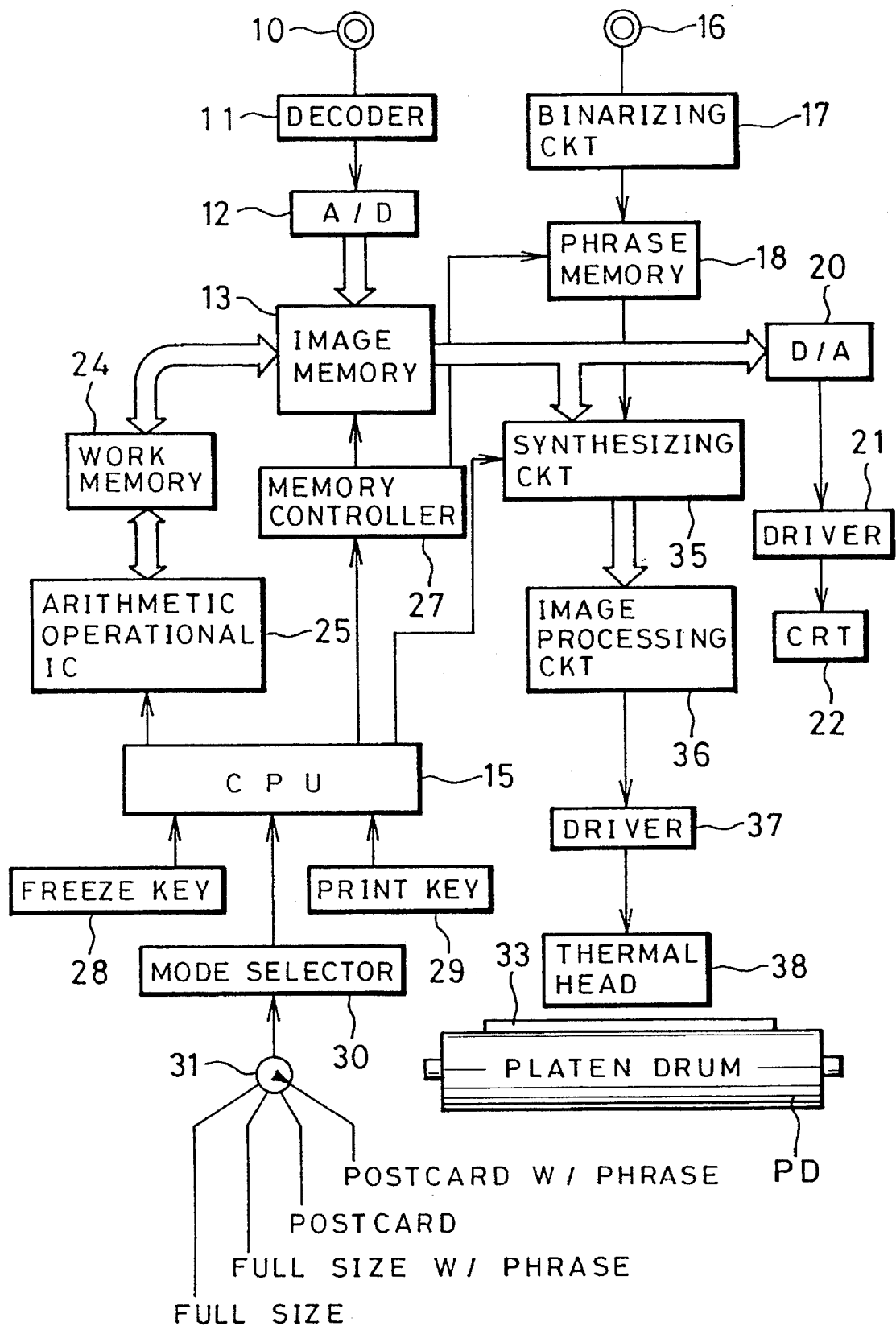
FIG. 1 is a schematic diagram illustrating a video printer according to the present invention.
Figure 1A:
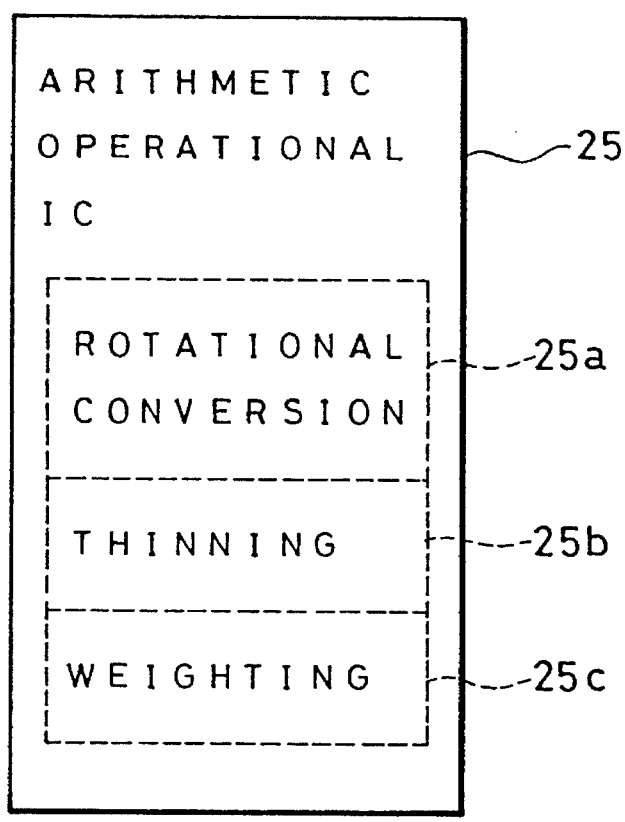
FIG. 1A is a schematic diagram illustrating an arithmetic operational IC of the video printer.
Figure 6A:
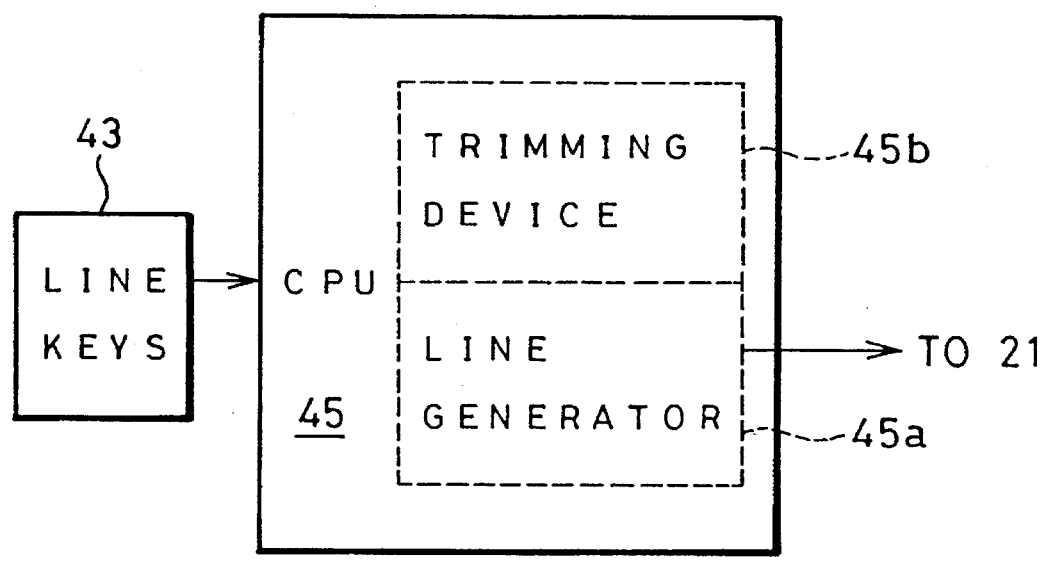
FIG. 6A is a schematic diagram illustrating electrical arrangement for designating the limited image to be recorded.

In FIG. 1, a video printer has an input terminal 10, which is supplied by an electronic still camera, video camera, and the like with an NTSC imaging signal representing an image picked up by the same camera. The imaging signal is sent into a decoder 11, and separated into red (R), green (G) and blue (B) signals therein. Those color signals are digitized by in an A/D converter 12, and sent into an image memory 13, which has an 8-bit construction for each color, and stores the signals reproducing a halftone of 256 steps. A CPU 15 supplies a control signal into a memory controller 27, which writes halftone image data of one frame to the image memory 13 color by color in response to the control signal.

The video printer is of a direct thermal printing type. A thermosensitive recording sheet 33 is heated by a stationary thermal head 38 having a great number of heating elements (see FIG. 5A) arranged in a main scanning direction M, and moved by a platen drum PD at a regular pitch in a subsidiary scanning direction S, to form an image directly on the thermosensitive recording sheet 33.

The phrase associated with the image, such as a date of picking up the image or a literal expression explaining the image, is supplied by a video camera or a still video player, and entered through an input terminal 16 into a binarizing circuit 17. Video signals of each pixel of the phrase are compared with a threshold value by the binarizing circuit 17, and converted into phrase data of binary form. The phrase data is written to a phrase memory 18.

The halftone image data written in the image memory 13 is sent into a D/A converter 20, and causes a monitor driver 21 to display a simulation of a reproduced image on a monitoring the CRT 22 as a form played by a still video player or video camera. When a user observes CRT 22, he can freely select images to be printed. In a postcard mode, the halftone image data in the image memory 13 is transferred to a work memory 24, and treated in an arithmetic operational IC 25, where the data is thinned by a thinning section 25b and rotationally converted by a rotational converting section 25a. The processed halftone image data is written to an upper half of storage area in the image memory 13.

The CPU 15 controls a memory controller 27 in the writing and reading of the data regarding the image memory 13, the phrase memory 18 and the work memory 24. The memory controller 27 operates in either of a Through state and a Freezing state. In the operation of the Through state, the memory controller 27 writes data to, and reads data from, the image memory 13 in the time sharing fashion. In the operation of the Freezing state, the memory controller 27 inhibits any data of a new frame from being written to the image memory 13 and the phrase memory 18, and transfers the halftone image data to the work memory 24 from the image memory 13.

The CPU 15 is connected to a freezing key 28, a print starting key 29, and a mode selector 30. The mode selector 30 is provided with a mode selecting wheel 31, through which one desired printing mode is selected from four preset modes, including: a full-size mode where the halftone image is printed on a full surface of the recording sheet 33; a phrased full-size mode where the halftone image is printed on the full surface of the recording sheet 33 in combination with a phrase; a postcard mode where the halftone image is printed on half the surface of the recording sheet 33; and a phrased postcard mode where the halftone image is printed on half the surface of the recording sheet 33 in combination with the phrase. It is to be noted that the phrased full-size mode superimposes the phrase on a full-size image. The phrased postcard mode prints the phrase on the half of the surface different from a postcard image. For printing the postcard image on half the surface, the halftone image is thinned and converted rotationally.

In accordance with the one selected printing mode, the mode selector 30 sends a mode signal to the CPU 15, which determines a printing condition at which the arithmetic operational IC 25 it to be set. In the postcard mode or the phrased postcard mode, the arithmetic operational IC 25 converts rotationally, and thins, the halftone image data stored in the work memory 24.

Figure 3:
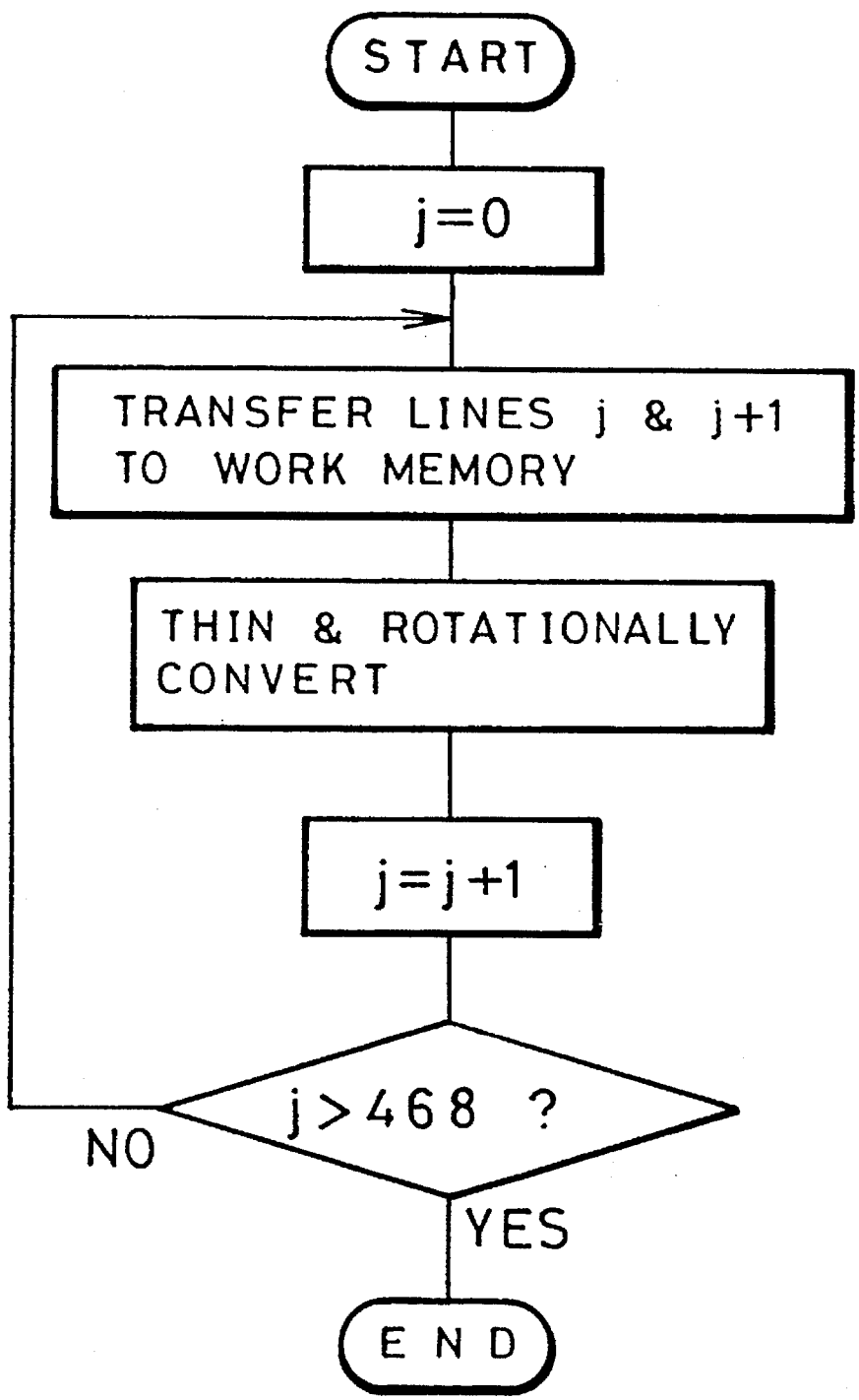
FIG. 3 is a flow chart illustrating processes of rotationally converting and thinning data.
Figure 4:
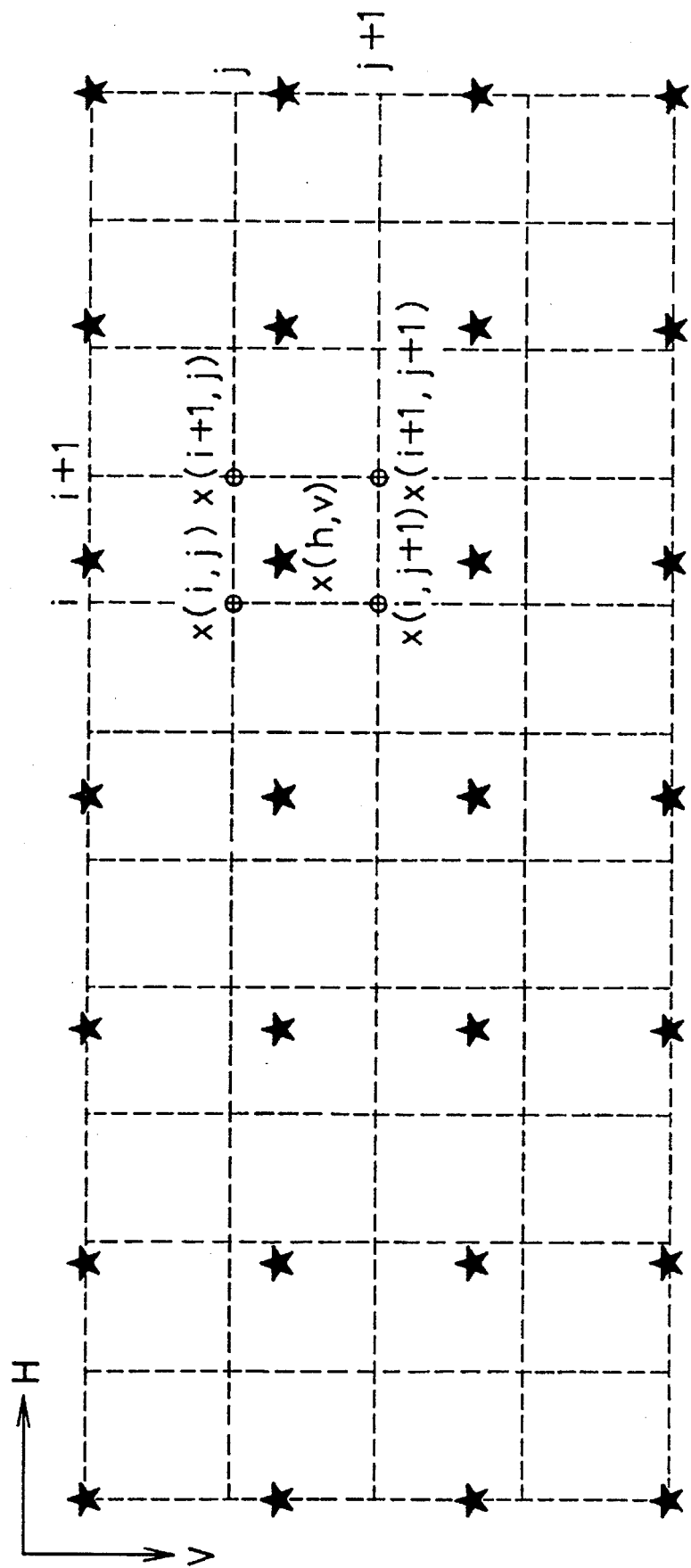
FIG. 4 is an explanatory view illustrating a relationship between pixels before and after the thinning.
Figure 5:
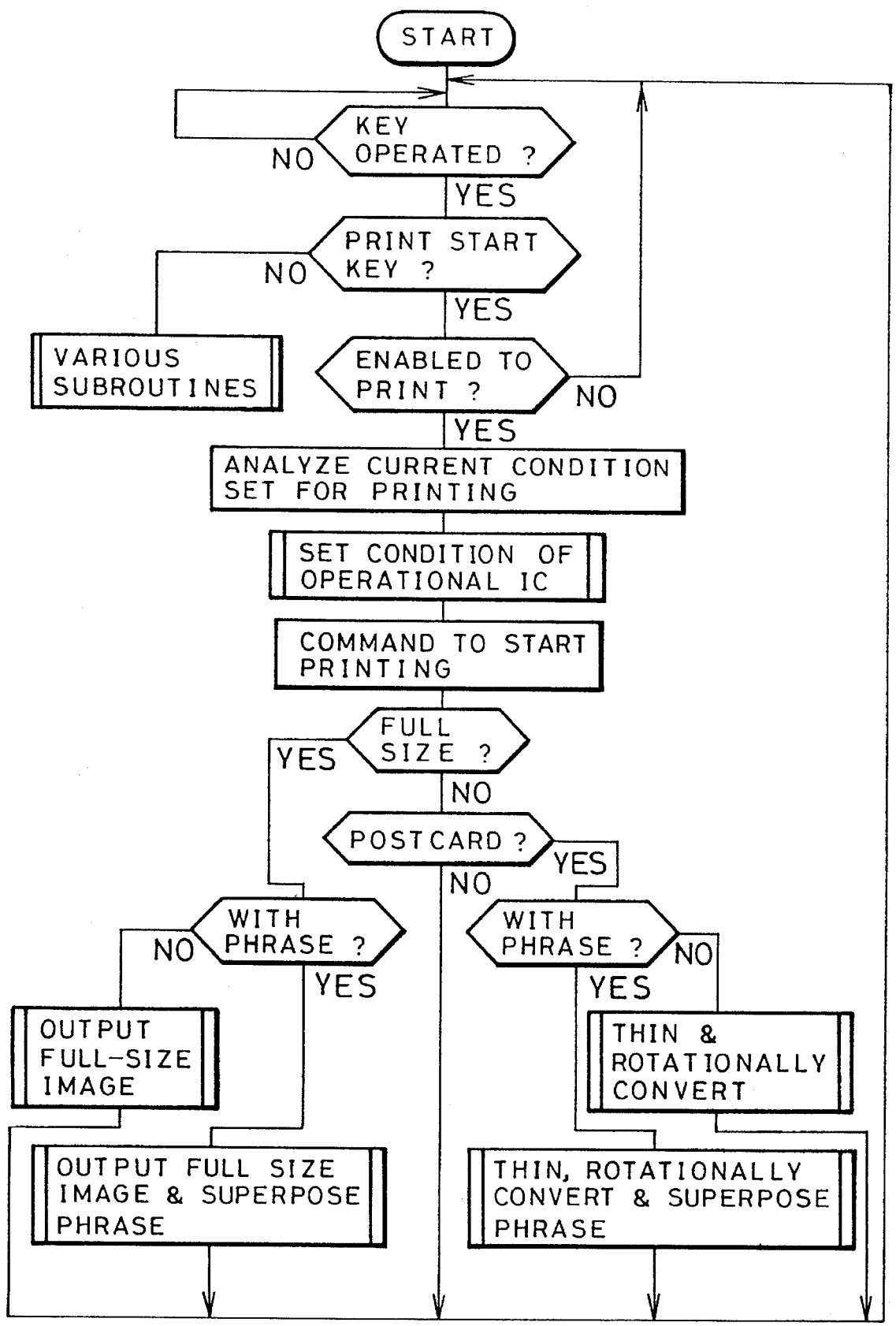
FIG. 5 is a flow chart illustrating a sequence of printing in the video printer.
Figure 5A:
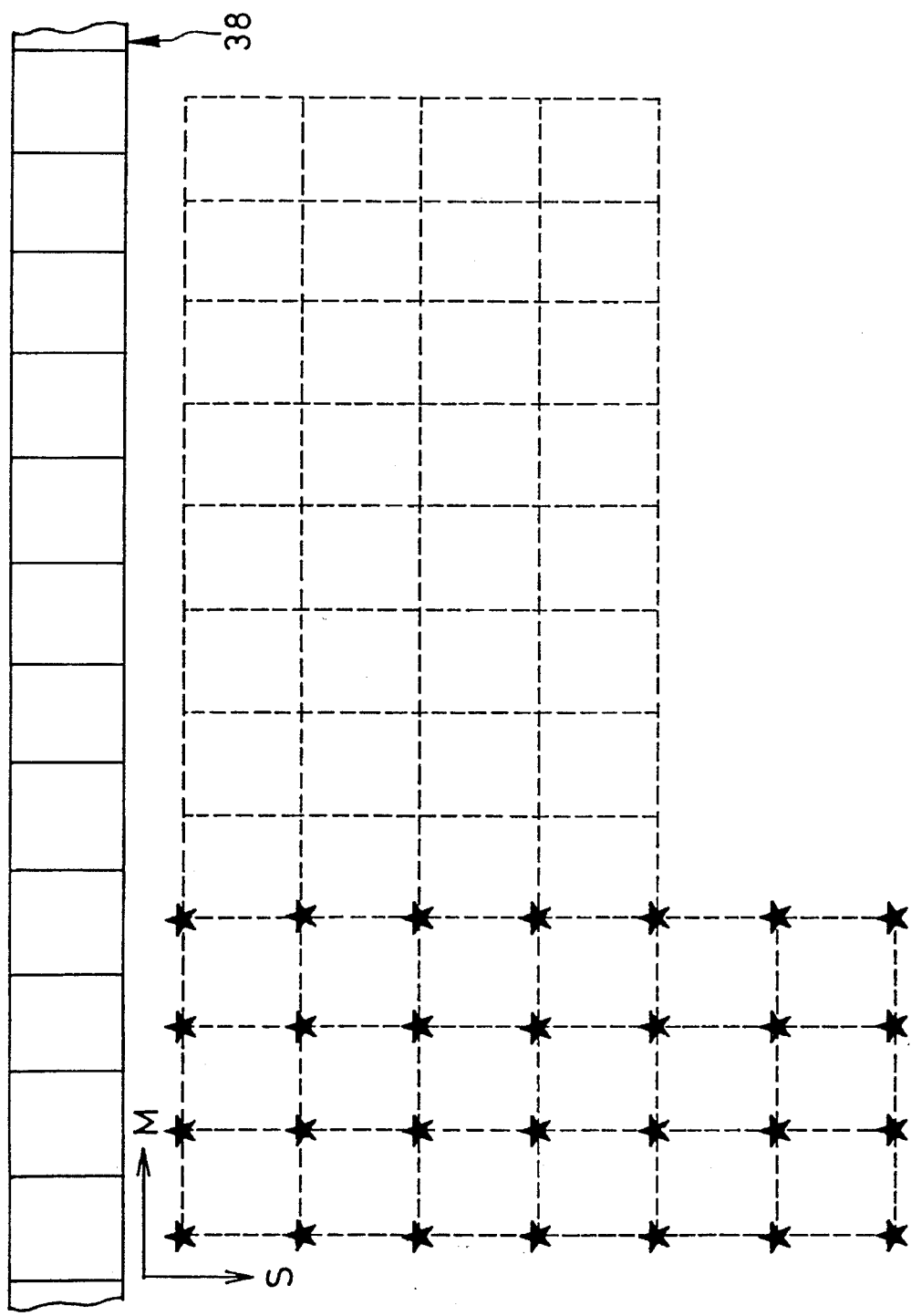
FIG. 5A is an explanatory view illustrating a relationship between dots for the postcard image and full-size image, together with a thermal head.
Figure 6:
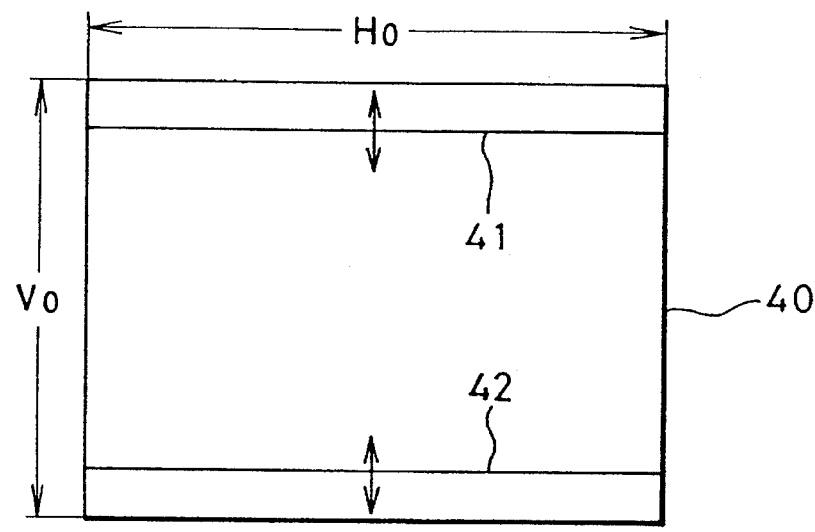
FIG. 6 is an explanatory view illustrating a screen of a CRT according to another preferred embodiment in which part of a displayed image is limited as a range to be recorded.
Figure 7:
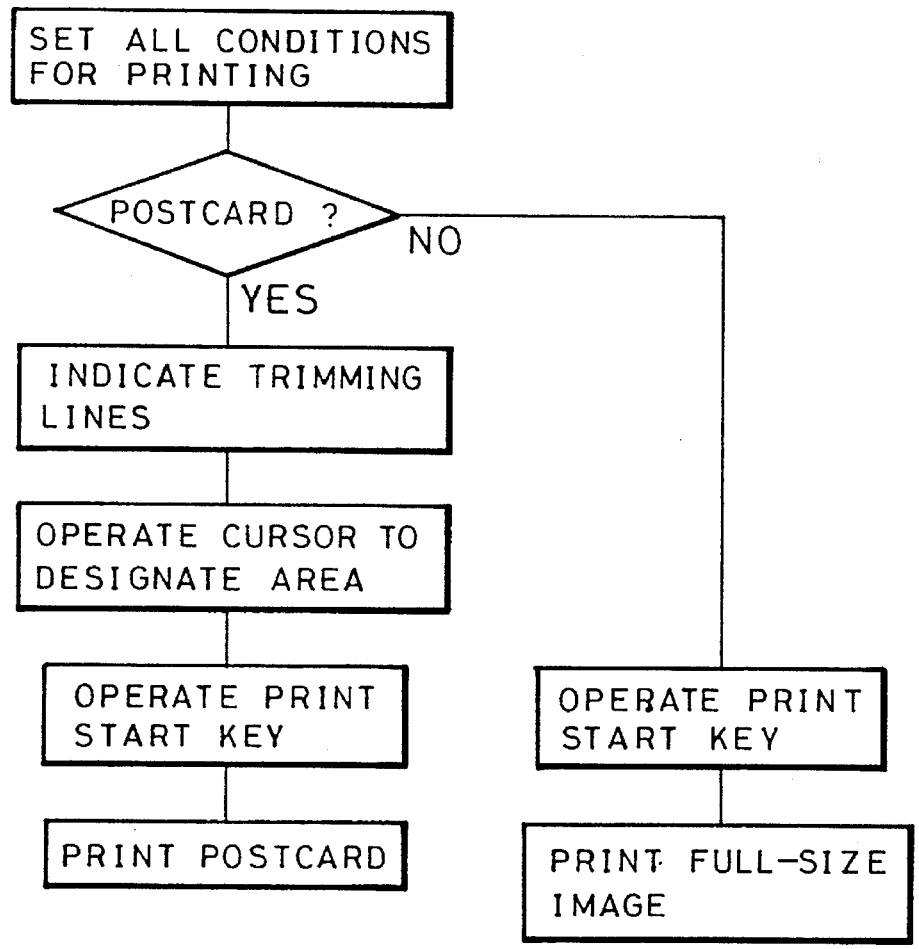
FIG. 7 is a flow chart illustrating a sequence of printing in the embodiment.
Figure 8A:
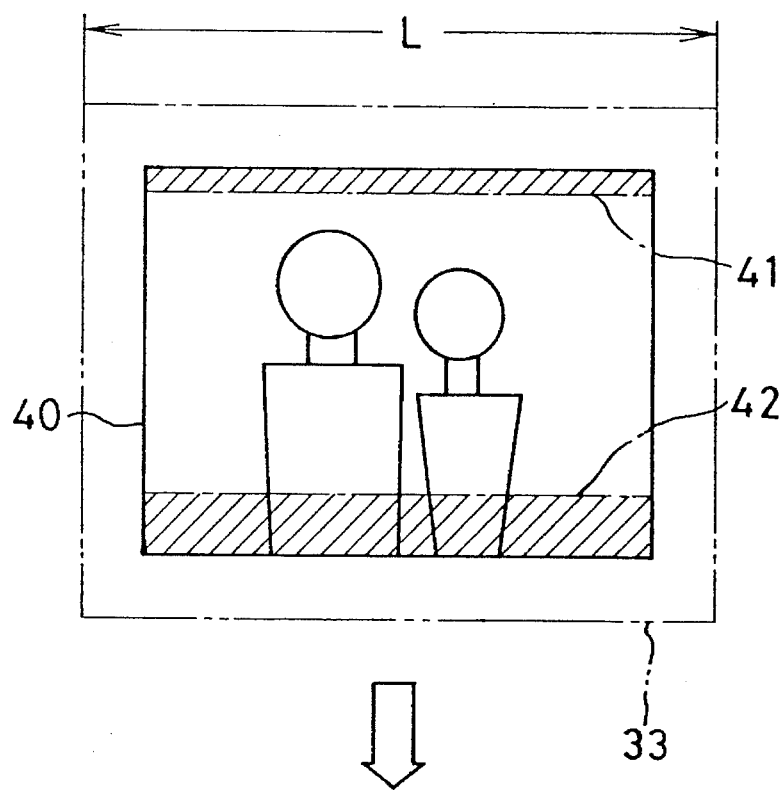
FIGS. 8A and 8B are explanatory views, respectively illustrating the image simulated on a CRT and an image printed on a recording sheet.
Figure 8B:
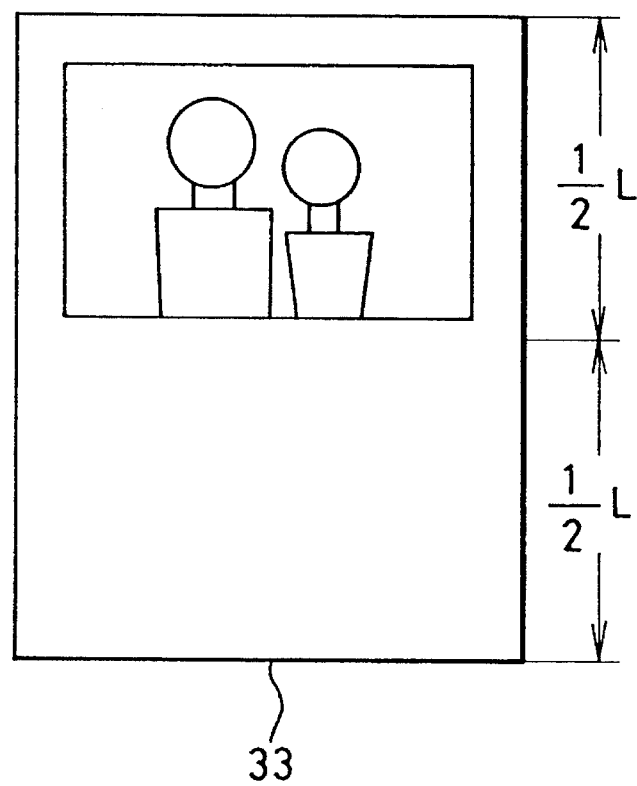

The thinning and rotational converting processes are referred to with reference to FIGS. 2A to 4. The NTSC imaging signal is sampled at 14 MHz, so that the halftone image data has a dot aspect ratio of approximately 6/7. As depicted in FIG. 5A, a postcard image is to be printed by use of the same thermal head 38, and at the same speed of the platen drum PD, as when a full-size image is printed. The postcard image requires finishing without distortion, even in reducing the halftone image to half an area of the recording sheet 33, and in converting the same rotationally to a vertical orientation from a horizontal orientation. Let a be a ratio of the reduction. The number of the dots H·V of the full-size image and the number of the dots $H_T \cdot V_T$ of the postcard image are determined to meet the equations:

$$H_T = 6/7 \cdot a \cdot H;$$

$$V_T = 7/6 \cdot a \cdot V;$$

$$V_T = 1/2 \cdot H.$$

To shorten time for the arithmetic operation, it is preferred to give integers for the dot numbers.

$$a = 7/11; \; H:H_T = 11:6; \; V:V_T = 4:3.$$

Accordingly, the dot numbers are approximated as:

$$H = 704; \; V = 468; \; H_T = 384; \; V_T = 352.$$

As illustrated in FIG. 3, a line number j is reset as 0. Then halftone image data of pixels of lines j and j+1 are transferred to the work memory 24. To obtain halftone image data x(h, v) of new pixels after thinning the data, the image data x(i, j), x(i+1, j), x(i, j+1) and x(i+1, j+1) are used in a weighting section 25c for calculation in combination with weighting coefficients in consideration of intervals, which is depicted in FIG. 4 and expressed as below:

$$x(h, v) = \{\alpha\gamma \, x(i, j) + \beta\gamma \, x(i+1, j) + \alpha\delta \, x(i, j+1) + \beta\delta \, x(i+1, j+1)\}/(6 \cdot 3)$$

where i=11/6·h; j=4/3·v; α=6−β; γ=3−δ; and β is a remainder of dividing of 11·h by 6; and δ is a remainder of dividing of 4·v by 3. It is to be noted that the intersections of the broken lines represent positions of pixels before the thinning, and the asterisks represent positions of pixels after the thinning. Both of those marks correspond to the marks appearing in FIG. 5A. The halftone image data of respective pixels stored in the image memory 13 are transferred serially every two lines to the work memory 24. The arithmetic operational IC 25 thins and rotationally converts the image data, until completing operation of one frame or 468 lines. The obtained halftone image data of new pixels are written to the upper half to the storage in the image memory 13.

In the printing, the CPU 15 commands the image memory 13, from which the halftone image data is read, and commands the phrase memory 18, from which the phrase data is read. Those data are sent into the image synthesizing circuit 35, which combines the halftone image data and the phrase data in accordance with the selected printing mode. The image synthesizing circuit 35 sends the synthesized data to an image processing circuit 36.

The image processing circuit 36 subjects the three-color image data to a masking process, and converts them to yellow (Y), cyan (C) and magenta (M) halftone image data. As the yellow color is first to be printed, yellow image data is selected from the three-color image data, and sent to a head driver 37. The thermal head 38 consists of numerous heating elements forming an array, each of which is driven selectively in accordance with the image data, thermally to record the yellow image on the recording sheet 33 one line after another. After each time of heating the recording sheet 33, the recording sheet 33 is optically fixed by application of radiation. The three-color frame-sequential recording is performed.

The operation of the above embodiment is described with reference to FIG. 5. The video signal of the halftone image played by the still video player is decoded by the decoder 11, converted by the A/D converter 12, and sent into the image memory 13. The CPU 15 command the memory controller 27 to enter the Through state for controlling the image memory 13. In the Through state, the image data are written to, and read from, the image memory 13 in the time sharing fashion. As is known in the art, the memory controller 27 responds to a synchronizing signal and generates the address signal. The image data is written or read in the location of the generated address.

When the image memory 13 is in the course of the reading, the halftone image data is read pixel by pixel, and sent out to the D/A converter 20, where the halftone image data is converted into a analog form, and sent to the CRT driver 21. The CRT driver 21 displays the halftone image on the CRT 22.

Figure 2A:
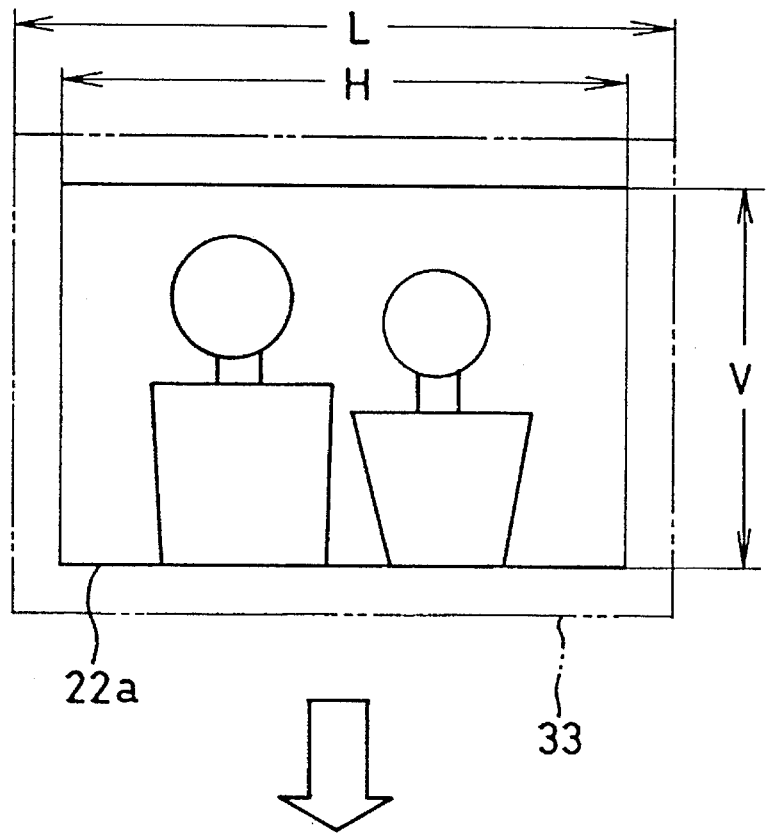
FIG. 2A is an explanatory view illustrating an image simulated on a CRT.
Figure 2B:
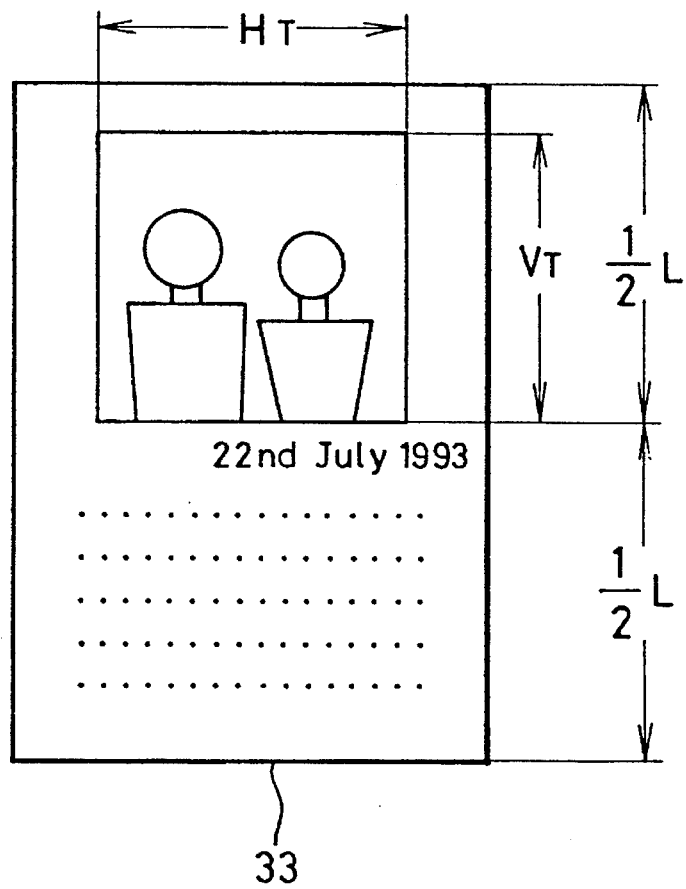
FIG. 2B is an explanatory view illustrating an image printed on a recording sheet as postcard.

The user operates the still video player to change from one frame to another. A halftone image to be printed is selected by the user, at a screen 22a of the CRT 22 as illustrated in FIG. 2A. The state illustrated in this drawing also relates to an image which would be printed in the full-size mode on the recording sheet 33.

For inputting of the phrase information, the memory controller 27 is changed over to the Through state for the output. The phrase information is converted by the binarizing circuit 17 into phrase data in a binary form, and sent to the phrase memory 18. The memory controller 27 designates an address in the phrase memory 18, and causes alternate operation of writing and reading.

If any key is depressed, it is judged whether the depressed key is the print starting key 29. If it is not, the printer is entered into one of subroutines. When the user visually checks the one desired image through the CRT 22, he operates the freezing key 28 to enter the command of freezing. The CPU 15 changes over the memory controller 27 to the Freezing state. The memory controller 27 inhibits the image memory 13 and the phrase memory 18 from writing of any new frame thereto. The image data frozen in the image memory 13 is transferred to the work memory 24.

The mode selecting wheel 31 is operated to select the phrased postcard mode. The print starting key 29 is depressed. The CPU 15 evaluates the current condition as to whether the printing is performable currently. When it is, then the CPU 15 commands the arithmetic operational IC 25 to operate for printing a phrased postcard. Responsively the arithmetic operational IC 25 processes the image data stored in the work memory 24, and thins and rotationally converts the image data. The image data as processed is read from the work memory 24 by the memory controller 27, and written to the upper half of the storage in the image memory 13.

The dot aspect ratio of the halftone image data, as viewed at the vertical range per horizontal range, is $6/7$ for printing the full-size image. A dot aspect ratio after thinning the data is referred to. The data is thinned at the ratio of $3/4$ in the vertical direction, and thinned at the ratio of $6/11$ in the horizontal direction. Accordingly, the dot aspect ratio after the thinning is:

$$(6 \cdot 11/6)/(7 \cdot 4/3) = 33/28$$

When the data is rotationally converted, the ratio becomes $28/33$, which is nearly equal to $6/7$. The difference between them is:

$$(28/33)/(6/7) - 1 = -1/99$$

This means that, when the halftone image is printed as the postcard image, the horizontal range of the postcard image is proportionally changed only at about one percent. Therefore, the postcard image can be printed in a condition in reproduction as good as the full-size image without thinning.

Then the memory controller 27 reads the halftone image data of one line pixel by pixel from the image memory 13, and sends it to the synthesizing circuit 35. The phrase data of one line is read pixel by pixel from the phrase memory 18, and sent to the synthesizing circuit 35. The synthesizing circuit 35 selects either of the halftone image data and the phrase data. The selection depends on existence of the phrase data. The halftone image and the phrase are combined. When in the phrased postcard mode, the phrase data is written to a blank area in the storage for the halftone image data, so as to print the phrase in the blank area on the recording sheet 33.

The synthesized data of the combined image is subjected to the masking process and the color conversion in the image processing circuit 36. The yellow image data is separately sent into the head driver 37, which drives the thermal head 38 to record the yellow image line after line in a yellow thermosensitive coloring layer in the recording sheet 33. Then ultraviolet rays having a wavelength of 420 nm are applied to the recording sheet 33 to fix the yellow coloring layer.

After the thermal recording of the yellow image, the platen drum PD terminates one rotation. The recording sheet 33 comes again to the position at the thermal head 38. Then the magenta image starts being recorded thermally. In the thermal recording of the magenta image, the image data is read line after line by the image memory 13. The image processing circuit 36 sends the magenta image data to the head driver 37, and drives the thermal head 38, which thermally records the magenta image line after line in a magenta thermosensitive coloring layer in the recording sheet 33. Then ultraviolet rays having a wavelength of 365 nm are applied to the recording sheet 33 to fix the magenta coloring layer.

After the magenta recording, the cyan image is recorded line after line in a cyan coloring layer in the recording sheet 33. Now the color recording is terminated without fixing the cyan coloring layer.

FIGS. 6 to 8B illustrate another preferred embodiment, in which the top and bottom margins of image simulated on a CRT are trimmed away. A screen 40 on the CRT has an aspect ratio of VO:HO=3:4. To adapt the image to be printed to half of the size of the full-size image, the top margin of 5.5% and the bottom margin of 5.5%, as viewed on the screen 40, are cut off to reduce 11% from the height of the halftone image, so as to adjust the aspect ratio. When in the postcard mode, a line generator 45a in a CPU 45 causes the screen 40 to indicate cursors or trimming lines 41 and 42 in clearly black color. A trimming device 45b in the CPU 45 excludes data corresponding to the two margins from the halftone image data, in association with the lines 41 and 42. The user can visually recognize the limited range of the image to be printed.

There are disposed externally operable line moving keys 43 connected to the CPU 45. Actuation of the line keys 43 shifts the lines 41 and 42 up and down, to change the limited range of the image to be printed as desired. The operation of the thinning, the rotational conversion, and the data synthesis is the same as the above. Note that, in the initial step of FIG. 7, all the conditions prior to the printing are set, and include the depressed state of the print starting key 29, the status enabled for printing, and the command to the arithmetic operational IC 25.

In the above embodiment, the halftone image is simulated on the CRT 22 without simulating the phrase. Alternatively the phrase may be simulated on the CRT 22 in combination with the halftone image, so that the combined image can be monitored and checked on the CRT 22. In the above, the halftone image data, after being thinned and converted rotationally, is written to the upper half of the storage in the image memory 13. Alternatively, a lower half of the storage in the image memory 13 may be used. Further the processed halftone image data may be written to a location as desired in the image memory 13. During the writing the data, the simulated image may be checked through the CRT 22.

The above embodiments are adapted to a line printer in which a color thermosensitive recording sheet and a thermal head are moved one-dimensionally relative to each other. The present invention is also applicable to a serial printer in which both a color thermosensitive recording sheet and a thermal head are moved. In the above, the thermosensitive recording sheet 33 to be printed is rotated on the platen drum PD, with the thermal head 38 stationary. Instead, a color thermosensitive recording sheet may be linearly and reciprocally moved by a pair of transport rollers. The invention is also applicable to a monochromatic thermal printer.

In the above, the video printer is of the type of direct thermal recording. The present invention is also applicable to a thermal dye transfer type and a thermal wax transfer type, and other types of thermal transfer printing, and any other types of a thermal printer, as well as an ink-jet printer and an electronic photo printer called laser printer.

In the above, the recording sheet 33 is oriented on the platen drum PD so that the longitudinal direction of the recording sheet 33 coincides the main scanning direction of the thermal head 38. Alternatively, the recording sheet 33 may be so set that its width direction coincides the main scanning direction of the thermal head 38.

In the above, the phrase can be recorded in both phrased full-size mode and phrased postcard mode. It is further preferred to orient the phrase in the manner similar to the orientation of the image with which the phrase is associated. In the phrased full-size mode where the image is oriented to orient the recording sheet 33 horizontally, it is favorable to give the horizontal orientation to the associated phrase. In the phrased postcard mode where the image is oriented to orient the recording sheet 33 vertically, the vertical orientation can be given to the associated phrase. An additional converter for changing a size, position, and rotational orientation of the phrase can be disposed for treating the phrase data.

In the above, the halftone image data is thinned, then weighted, and finally converted rotationally. However, it is possible to change the order of those three steps.

In the above, the image has the aspect ratio which is near to, but vertically narrower than, that of the recording sheet 33. It is possible to predetermine the slight difference in the aspect ratio between the image and the recording sheet.

In the above, the size of the postcard image is halved. It is possible to determine the factor in reduction to be more than ½, or less than ½. In the above, the postcard image is printed in the marginal half of the recording sheet. Alternatively, the postcard image may be printed on a middle portion of the recording sheet. Top and bottom margins may be used for recording one or more phrases.

In the above, the image data is thinned and weighted. However, image data may be thinned only, without being weighted.

The phrase according to the above can be a title, comments, or other literal expression as desired. Further, a rough drawing, a pattern, or any other figure can be recorded instead of the phrase if the imaging quality through the binarizing treatment of the figure is acceptable in view of the use of the figure.

In the embodiment in which the printing range is limited, the top and bottom margins of the image are trimmed away. Instead, only either of the top and bottom margins may be trimmed away. In the above, the two trimming lines 41 and 42 are indicated. Alternatively, only a single trimming line may be indicated for the single margin trimmed away. Furthermore, right and left margins of the image may be trimmed away instead of the top and bottom margins. It is possible to indicate trimming lines vertically extended.

In the above, the trimming lines 41 and 42 are shiftable through the line moving keys 43 to adjust the limited range to be printed. Alternatively, trimming lines may be preset fixedly, and automatically indicated for being checked visually. Those trimming lines will not require any line moving keys.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A video printer for printing an image on a recording sheet in accordance with image information, said image having a predetermined aspect ratio and being longer in a horizontal direction than in a vertical direction, said predetermined aspect ratio being substantially equal to an aspect ratio of said recording sheet being oriented horizontally longer than vertically, said video printer comprising:

a size reducing device for processing said image information to reduce a size of said image;

a rotationally converting device for automatically converting said image information to cause orientation of said image to make a one fourth rotation, allowing a reduced image to remain horizontally longer in a predetermined portion of said recording sheet being oriented vertically longer than horizontally; and a recording head, supplied with said image information after said reduction and said rotational conversion, for recording said image on said recording sheet, said image being recorded in said predetermined portion of said recording sheet.

2. A video printer as defined in claim 1, wherein said video printer is a thermal printer, and said recording head is a thermal head for generating heat toward said recording sheet.

3. A video printer as defined in claim 2, wherein said recording sheet is a color thermosensitive recording sheet, and said image has colors and is recorded by said thermal head in three-color frame-sequential fashion.

4. A video printer as defined in claim 3, wherein said predetermined aspect ratio is substantially 4/3.

5. A video printer as defined in claim 1, wherein said recording head is disposed to extend in a main scanning direction, and records respectively one dot in one respective pixel on said recording sheet, and said dot is changed in coloring density in accordance with said image information;

said video printer further comprising a moving device for moving said recording sheet relative to said recording head, at a predetermined pitch, and i n a subsidiary scanning direction perpendicular to said main scanning direction.

6. A video printer as defined in claim 5, wherein said reducing device reduces said image substantially to a half, and said predetermined portion includes an upper or lower half of said recording sheet being oriented vertically longer than horizontally.

7. A video printer as defined in claim 6, wherein said reducing device produces new image data from said image information by arranging said image information in a matrix associated with pixel positions, generating said new image data by plotting new pixels to lie on said matrix and weighting image information from up to four pixel positions adjacent to each of said new pixels as a function of said predetermined aspect ratio and an aspect ratio of said image information after said reduction and added together, to be said new image data of said new pixels.

8. A video printer as defined in claim 6, wherein said reducing device thins said image information to reduce said image.

9. A video printer as defined in claim 8, further comprising a weighting device for weighting said image information thinned by said reducing device, wherein said weighting device generates an image after thinning having a density distribution substantially equal to said image before thinning by said reducing device.

10. A video printer as defined in claim 1, further comprising:

a phrase memory for storing information of a phrase; and an image combining device for combining said phrase information with said image information after said reduction and said rotational conversion, said phrase being recorded on said recording sheet outside where said image is recorded.

11. A video printer as defined in claim 10, further comprising:

a binarizing device for converting said phrase information into binary phrase data; and a digital converter for converting said image information into digital image data representing a halftone.

12. A video printer as defined in claim 11, further comprising:

an image memory storing said digital image data; and a work memory for reading said digital image data from said image memory in response to an external operation, said digital image data being processed by said reducing device, converted by said rotationally converting device, and then storing processed, converted image data in said work memory, said image memory receiving said processed, converted image data from said work memory.

13. A video printer as defined in claim 12, further comprising an externally operable mode selector, set to select whether to subject said digital image data stored in said image memory to said reduction and said rotational conversion or not, wherein if lack of said reduction and said rotational conversion is selected through said mode selector, then said image is recorded in an entirety of said recording sheet.

14. A video printer as defined in claim 1, further comprising:

a display device, provided with an aspect ratio substantially equal to said aspect ratio of said recording sheet, for displaying an entirety of said image to be monitored; and a trimming device, for limiting a part of said image information after said rotational conversion and said reduction, to designate part of said displayed image as a range to be recorded, said range defined by shortening said image in a direction along one side of said image.

15. A video printer as defined in claim 14, wherein said range to be recorded is defined by shortening said image vertically;

said video printer further comprising a line generator, connected to said display device, for causing said display device to indicate at least one trimming line, which represents a top or bottom edge of said range limited by said trimming device.

16. A video printer as defined in claim 15, further comprising an externally operable commanding device, operated to shift said trimming line on said display device.

17. A video printer as defined in claim 1, wherein said predetermined portion is longer in a vertical direction than in a horizontal direction when in an orientation which is the same as an original orientation of said image information.

18. A video printer as defined in claim 7, wherein said weighting by said reducing device to obtain data x(h,v) of new pixels is performed in accordance with the following equation:

$$x(h,v) = \{\alpha\gamma x(i,j) + \beta\gamma x(i+1,j) + \alpha\delta x(i,j+1) + \beta\delta x(i+1,j+1)\}/(H_T \cdot V_T)$$

where $i = H/H_T \cdot h$; $j = V/V_T \cdot v$; $\alpha = H_T - \beta$; $\gamma = V - \delta$; $\beta$ is a reminder of dividing $H \cdot h$ by $H_T$; $\delta$ is a remainder of dividing $V \cdot v$ by $V_T$; H is a number of horizontal dots of said image; $H_T$ is a number of horizontal dots of said image after said reduction; V is a number of vertical dots of said image; and $V_T$ is a number of vertical dots of said image after said reduction.

19. A video printer as defined in claim 5, wherein said predetermined portion comprises an upper or lower half of said recording sheet being oriented vertically longer than horizontally.

20. A printing method of printing an image on a recording sheet in accordance with image information, said image having a predetermined aspect ratio and being longer in a horizontal direction than in a vertical direction, said predetermined aspect ratio being substantially equal to an aspect ratio of said recording sheet being oriented horizontally longer than vertically, said printing method comprising steps of:

processing said image information to reduce a size of said image;

allowing a reduced image to remain horizontally longer in a predetermined position of said recording sheet being oriented vertically longer than horizontally by converting said image information to cause orientation of said image to make a one fourth rotation; and recording said image on said recording sheet in accordance with said image information after said reduction and said rotational conversion, said image being recorded in said predetermined portion of said recording sheet.

21. A printing method as defined in claim 20, further comprising steps of:

driving a recording head in accordance with said image information, said recording head disposed to extend in a main scanning direction, for recording respectively one dot in one respective pixel on said recording sheet, said dot being changed in coloring density in accordance with said image information; and moving said recording sheet relative to said recording head, at a predetermined pitch, and in a subsidiary scanning direction perpendicular to said main scanning direction.

22. A printing method as defined in claim 21, wherein said reducing step includes reducing said image substantially to one half of an original image, and said predetermined portion including an upper or lower half of said recording sheet being oriented vertically longer than horizontally.

23. A printing method as defined in claim 22, wherein said processing step includes thinning said image information to reduce said image to a thinned image and weighting said thinned image, said weighting step generating an image after said thinning step having a density distribution substantially equal to said image before said thinning step.

24. A printing method as defined in claim 20, further comprising steps of:

receiving information of a phrase;

combining said phrase information with said image information after said reduction and said rotational conversion; and recording said phrase on said recording sheet outside where said image is recorded.

25. A printing method as defined in claim 24, further comprising steps of:

converting said phrase information into binary phrase data; and converting said image information into digital image data representing a halftone.

26. A printing method as defined in claim 20, further comprising steps of:

displaying an entirety of said image on a display device to be monitored; and limiting a part of said image information after said reduction and said rotational conversion, to designate part of said displayed image as a range to be recorded, said range defined by shortening said image in a direction along one side of said image.

27. A printing method as defined in claim 26, wherein said range to be recorded is defined by shortening said image vertically;

said printing method further comprising a step of causing said display device to indicate at least one trimming line, which represents a top or bottom edge of said range limited by said trimming device.

28. A printing method as defined in claim 20, further comprising setting said predetermined portion to be longer in a vertical direction than in a horizontal direction when in an orientation which is the same as the original orientation of said image information.

29. A printing method as defined in claim 20, wherein said processing step includes:

arranging said image information in a matrix associated with pixel position;

plotting new pixels to lie on said matrix;

generating new image data by weighting image data from up to four of said pixel positions adjacent to each of said new pixels as a function of said predetermined aspect ratio and an aspect ratio of said reduced image.

30. A printing method as defined in claim 29, wherein said generating step includes performing said weighting to generate data x(h,v) of new pixels in accordance with the following equation:

$$x(h,v)=\{\alpha\gamma x(i,j)+\beta\gamma x(i+1,j)+\alpha\delta x(i,j+1)+\beta\delta x(i+1,j+1)\}/(H_T \cdot V_T)$$

where $i=H/H_T \cdot h$; $j=V/V_T \cdot v$; $\alpha=H_T-\beta$; $\gamma=V-\delta$; $\beta$ is a reminder of dividing $H \cdot h$ by $H_T$; $\delta$ is a remainder of dividing $V \cdot v$ by $V_T$; H is a number of horizontal dots of said image; $H_T$ is a number of horizontal dots of said image after said reduction; V is a number of vertical dots of said image; and $V_T$ is a number of vertical dots of said image after said reduction.

31. A printing method as defined in claim 20, further comprising:

storing said image information in an image memory;

reading said image information from said image memory in response to an external operation into a work memory;

storing, after said processing step and said converting step, processed, converted image information in said work memory; and supplying said processed, converted image data from said work memory to said image memory.

* * * * *